Patented June 16, 1953

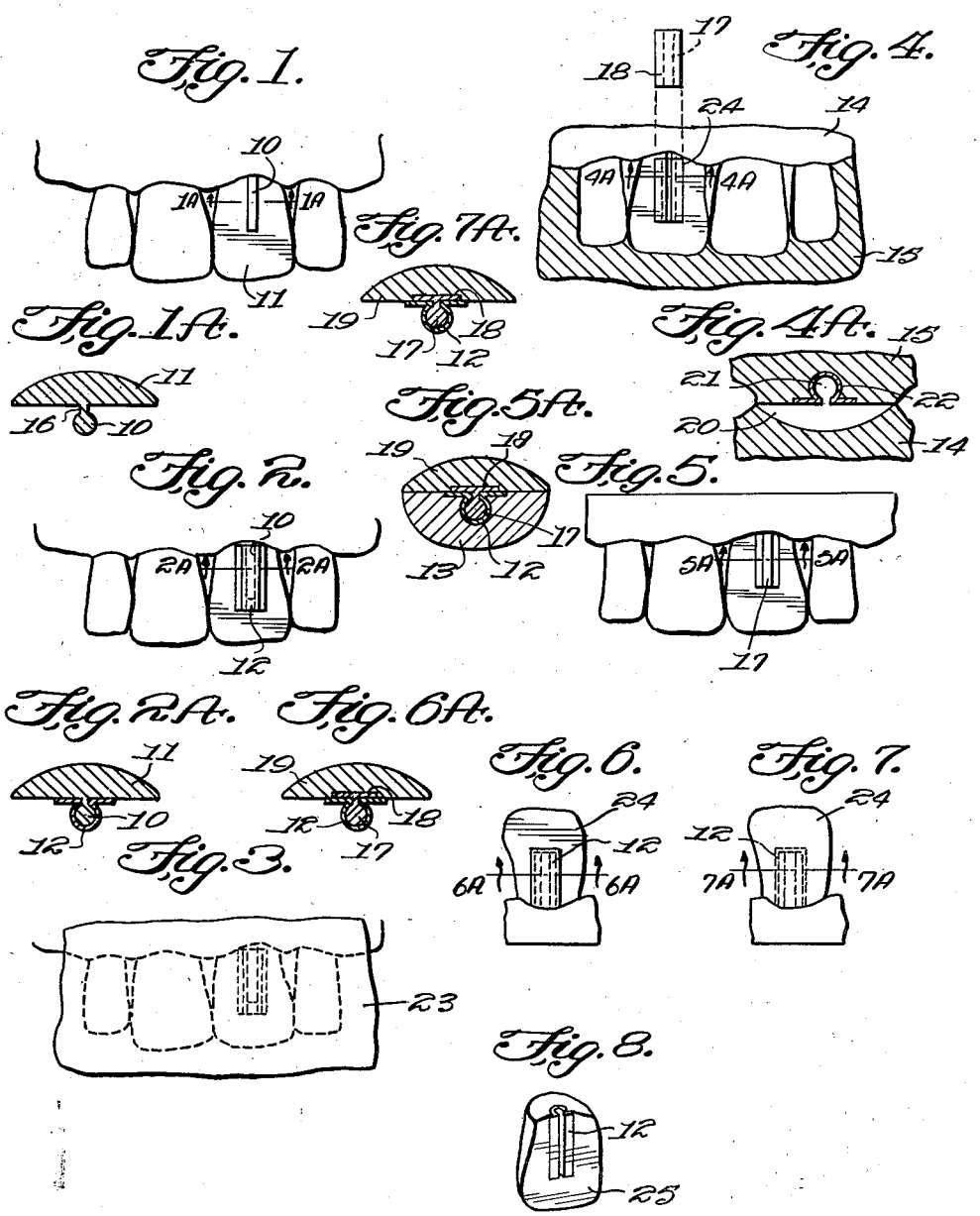

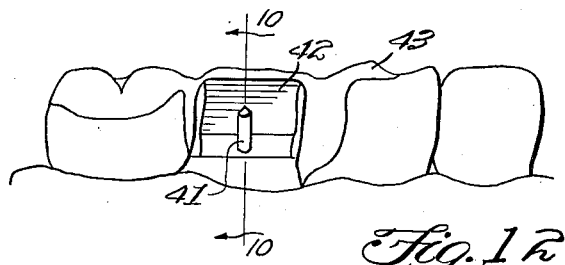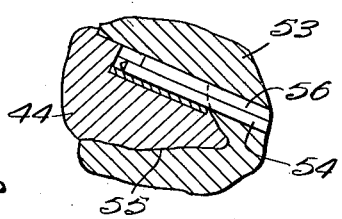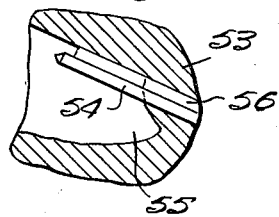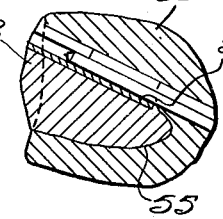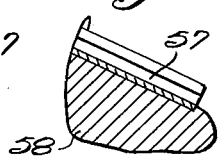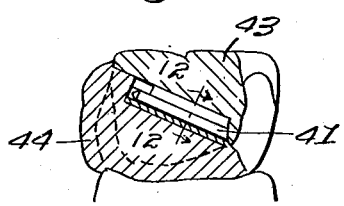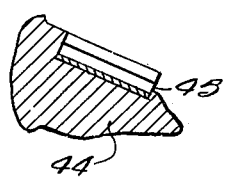

2,641,837

UNITED STATES PATENT OFFICE 2,641,837

PLASTIC TOOTH MOUNTING

Samuel J. Infante, Bloomfield, N. J., assignor to Peter B. Molinaro, Verona, N. J.

Application September 30, 1949, Serial No. 118,892

1 Claim. (Cl. 32—10)

This invention relates to mounting and backing devices for repairing broken teeth, and in particular a plastic backing including male and female elements upon which parts of teeth may be temporarily mounted, shaped, and permanently cast whereby broken teeth in the mouth and also on bridgework may be repaired.

The purpose of this invention is to provide means for repairing broken teeth whereby the missing part of a tooth is permanently mounted on the remaining part of a tooth or on a tooth mounting.

The usual bridgework for teeth includes different types of teeth which are formed of outer and inner sections with the sections connected by male and female elements. When a tooth breaks, a male or female element carried by the remaining portion of the tooth is exposed and it is difficult to replace the part broken away with a permanent mounting. With this thought in mind this invention contemplates an improved method of replacing the broken part of the tooth by taking a plaster impression of the area and, after the plaster hardens, removing the plaster which provides a model of the area of the mouth in which the broken tooth exists with the female backing element in the impression. A male plastic backing is then inserted into the model and a stone composition is poured therein. Upon hardening a model is provided that is a duplicate of the area in which the broken tooth is positioned. A stock porcelain tooth is then selected and a male plastic backing is carved from wax which is used to form a plastic tooth which is fitted to the model and consequently fits accurately in the mouth.

The object of this invention, therefore, is to provide an improved method of replacing broken teeth by mounting a female element in a facing that represents the broken part of a tooth and permanently mounting the said facing through the female backing thereof on a male backing positioned on the remaining part of the tooth.

Another object of the invention is to provide an improved mounting for permanently repairing broken teeth in which coacting male and female elements by which a facing is mounted on a crown may extend vertically or horizontally or at substantially any convenient angle.

A further object of the invention is to provide an improved method for permanently repairing broken teeth which is comparatively simple and inexpensive.

With these and other objects and advantages in view the invention embodies a mounting for broken teeth comprising a tine or prong permanently mounted on the remaining part of a tooth and a tubular female element mounted on a facing corresponding to the broken part of a tooth and adapted to be permanently secured to the tine or prong.

Other features and advantages of the invention will appear from the following description taken in connection with the drawings wherein:

Figure 1 is a view showing a front elevation of a plurality of teeth with the outer facing section of one of the teeth removed exposing a post on the tooth.

Figure 1a is a cross section through the remaining part of the tooth taken on line 1a—1a of Figure 1.

Figure 2 is a view similar to that shown in Fig. 1 showing a socket or female element positioned on the post and with the outer facing of a tooth omitted.

Figure 2a is a cross section through the remaining part of the tooth and male and female mounting elements being taken on line 2a—2a of Figure 2.

Figure 3 is a view similar to that shown in Figure 2 showing teeth embedded in a plaster cast.

Figure 4 is a view, similar to that shown in Fig. 3 with the outer part of the cast broken away with the remaining part thereof shown in section.

Figure 4a is a cross section taken on line 4a—4a of Figure 4 showing a cavity in which a permanent outer facing of a tooth with the male post thereon is cast.

Figure 5 is a detail similar to that shown in Figures 1 and 2 showing the post positioned on the outer face of the tooth.

Figure 5a is a cross section taken on 5a—5a of Figure 5 showing the finished article assembled.

Figure 6 is a detail showing the tooth with male and female mounting elements therein.

Figure 6a is a cross section taken on line 6a—6a of Figure 6 showing the male and female mounting elements and with the male element secured to the outer facing of the tooth.

Figure 7 is a view similar to that shown in Figure 6 showing the outer face of the tooth with the mounting elements shown in dotted lines.

Figure 7a is a section taken on line 7a—7a of Figure 7 showing the mounting elements in combination with the outer facing of the tooth.

Figure 8 is a detail illustrating a tooth section with a female mounting element cast therein.

Figure 9 is a view similar to that shown in Figure 1 illustrating a mounting wherein a part of the tooth with a female element therein is secured over a male element on a bridge or the like.

Figure 10 is a cross section through the bridge taken on line 10—10 of Figure 9 with the removable part of the tube omitted.

Figure 11 is a similar section showing the removable part of the tooth mounted in the opening in the bridge.

Figure 12 is a cross section through the mounting elements being taken on line 12—12 of Figure 11.

Figure 13 is a section similar to that shown in Figures 10 and 11 being taken through the removable cast and with the female socket therein.

Figure 14 is a section similar to that shown in Figure 11 illustrating the mounting elements extended through the mold.

Figure 15 is a detail showing a section similar to that shown in Figure 14 with the cast point of the tooth omitted.

Figure 16 is a similar view showing the mounting elements extended through both the cast and mold.

Figure 17 is a cross section through a tooth showing a female mounting element incorporated therein.

Referring now to the drawings wherein like reference characters denote corresponding parts the improved broken tooth repair mounting of this invention includes a plastic post 10 mounted on a base section 11 of a tooth, a tubular female element 12 cast in an outer facing 13, and a mold having an outer section 14 and an inner section 15.

The male and female mounting and backing elements are preferably made of plastic or other suitable material and in Figures 1 and 1a the post 10 is formed integral with the back 11 of a tooth, being connected thereto with a web 16. In Figures 5a and 7a a post 17 similar to the post 10 is formed on a base strip 18 and the strip 18 is embedded in a backing 19 similar to the backing 11. The backing element, as shown in Figure 1a, may be cast in a cavity 20 between the mold elements 14 and 15, as shown in Figure 4a wherein the post is formed in an opening 21 in the tubular female element 22 similar to the member 12. Figure 4 shows a part of a bridge with a female element 24 cast in the outer part of a tooth and with the male element 17, which is carried by a backing section of the tooth, illustrated in an exploded position separated from the female element and with the outer facing of the tube omitted.

In Figure 2 the female element is positioned over the male element and the outer facing of the tube is omitted as illustrated in Figure 2a. In replacing a broken tooth on this type of mounting the plastic female backing 12 is placed on the male post 10 and a plaster impression 23 is taken of the area. When the plaster hardens it is removed and a model of the mouth with the female backing therein is obtained. A male plastic backing 17 is then inserted in the female backing 12 and a stone composition is poured into the mold, which when hardened provides a model of the mouth around the area. A tooth may then be carved from wax on the male plastic backing and a plastic tooth may be cast therefrom. A backing 24 of the tooth is then cast on the strip 18 of the post 17 as shown in Figures 6 and 6a and the female backing 12 is positioned on the post. The parts are shown in the reverse position in Figure 7 wherein the male and female backing elements are shown in dotted lines.

Figure 8 illustrates the outer facing of the tube wherein the female backing 12 is cast in the facing 25 and in this the female backing may be inserted over the post of the male backing and the parts cemented together to provide a permanent mounting.

In the design illustrated in Figures 9 to 17 inclusive an inlay mounting is illustrated wherein a male member or post 41 is provided on an inner surface 42 of a bridge 43 and an inlay 44 having a female socket 45 cast therein is cemented in a cavity 46 with the female socket 45 positioned on the pin 41, as illustrated in Figure 11.

In forming the inlay a mold 53 may be formed from the bridge similar to the mold 23 whereby with a male pin 54 covered by the mold and extending into a cavity 55 a female socket 45 may be placed on the pin 54 and cast in the inlay 44. The pin or post of the mold is also provided with a web 56 corresponding to the web 52.

The inlay may also be cast with a female socket 57 corresponding to the socket 45 extended through the forward end of the inlay which is indicated by the numeral 58.

With the parts arranged in this manner the plastic male and female elements may be mounted on or cast in the sections of a tooth or bridge so that a broken end or face of a tooth may readily be replaced with a permanent mounting.

The male element may be positioned on the remaining part or base of a tooth or on the section of the tooth in the mouth or on a bridge and the female element may be positioned on or embedded in the part of a tooth replaced the broken part or facing, or the positions of the parts may be reversed with the plastic element on the stationary part of the tooth or bridge and the male element on the facing or section of the tooth that replaces the broken parts thereof.

The male and female element may be formed of plastic, metal, or any suitable material.

It will be understood that other modifications may be made in the design and arrangement of the parts without departing from the spirit of the invention.

What is claimed is:

In an artificial tooth, the combination which comprises a tooth base, a centrally positioned vertically disposed post spaced from the said base and connected by a longitudinal web to the base, a tooth facing having a vertically disposed centrally positioned opening therein spaced from the inner surface and having a slot in the inner surface thereof communicating with the said vertically disposed opening, said facing having recesses in the inner surface positioned on opposite sides of the said slot, and a tubular lining in the said centrally positioned opening of the tooth facing having a longitudinally disposed slot at one side and having flanges extended from the walls at the edges of the said slot, the walls of the said lining extended through the slot of the tooth facing and positioned with the flanges thereof in the said recesses in the inner surface of the tooth facing.

SAMUEL J. INFANTE.

References Cited in the file of this patent

UNITED STATES PATENTS

| Number | Name | Date |
|---|---|---|
| 1,937,345 | Jackman | Nov. 28, 1933 |
| 1,976,085 | Neurohr | Oct. 9, 1934 |
| 2,147,403 | Freedman | Feb. 14, 1939 |
| 2,398,671 | Saffir | Apr. 16, 1946 |
| 2,473,396 | Slavin | June 14, 1949 |